(12) United States Patent
McDonald, IV et al.

(10) Patent No.: US 10,657,497 B1
(45) Date of Patent: May 19, 2020

(54) JIRA DATA VISUALIZATION

(71) Applicant: JPMorgan Chase Bank, N.A., New York, NY (US)

(72) Inventors: Nathan W. McDonald, IV, Hockessin, DE (US); Jordan M. Rosenberg, Tampa, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/175,304

(22) Filed: Oct. 30, 2018

(51) Int. Cl.
*G06F 9/44* (2018.01)
*G06Q 10/10* (2012.01)
*G06F 40/103* (2020.01)

(52) U.S. Cl.
CPC ......... *G06Q 10/103* (2013.01); *G06F 40/103* (2020.01)

(58) Field of Classification Search
CPC ..... G06F 8/30; G06F 8/20; G06F 8/36; G06F 8/34; G06F 8/10
USPC ................................................. 717/106, 121
See application file for complete search history.

(56) References Cited

U.S. PATENT DOCUMENTS

2010/0088150 A1* 4/2010 Mazhar ................. G06F 9/5088
717/120

* cited by examiner

*Primary Examiner* — Chuck O Kendall
(74) *Attorney, Agent, or Firm* — Greenblum & Bernstein, P.L.C.

(57) ABSTRACT

Systems and methods are provided for the generation of a consolidated data repository report in order to visualize a consolidated and holistic view of the work for an entire organization. Such consolidated data reports may be transformed and modified to further enhance the visual and readability aspects of the report.

17 Claims, 3 Drawing Sheets

JIRA DATA VISUALIZATION

TECHNICAL FIELD

The present disclosure generally relates to data visualization relating to issue tracking and project management of software development projects.

BACKGROUND

In the field of software development, teams of developers often have work distributed across independent data repositories on data servers that may be interspersed with other teams throughout an organization or even with teams outside the organization. These data repositories are often not accessible to other teams within the organization or may be difficult to keep track of. Furthermore, the disparate nature of the data renders communication between the repositories or servers impractical or impossible. This can lead to confusion for project managers that need to analyze the progress of a project across several teams or an entire organization. Current solutions do not provide the ability to generate a holistic view of all of the work for a single organization.

It is therefore appreciated that a need exists for a method to collect all of the relevant information in disparate data repositories and build a consolidated and holistic view of the work for an entire organization.

SUMMARY

Systems and methods are provided for generating at least one consolidated data repository report from a plurality of data sources.

In an exemplary embodiment, a computer implemented method for generating at least one consolidated data repository report is provided. The method further comprises transmitting an application request to an application server, the application request based on an application parameter; receiving application data from the application server; transmitting a configuration data request to a configuration server, the configuration data request based on a configuration parameter; receiving configuration data from the configuration server; generating a data repository report request based on the received application data and configuration data; connecting to a plurality of data servers to acquire project data related to the data repository report request; and, generating at least one consolidated data repository report based on the project data.

In another exemplary embodiment, a system for generating at least one consolidated data repository report is provided. The system comprises at least one processor in communication with a memory, wherein the processor is configured to transmit an application request to an application server, the application request based on an application parameter; receive application data from the application server; transmit a configuration data request to a configuration server, the configuration data request based on a configuration data parameter; receive configuration data from the configuration server; generate a data repository report request based on the received application data and configuration data; access a plurality of data servers to acquire project data related to the data repository report request; and, generate at least one consolidated data repository report based on the project data.

In yet another exemplary embodiment, a non-transitory computer readable medium having instructions stored thereon for executing a method of generating at least one consolidated data repository is provided. When the instructions are executed by a processor, the processor is caused to perform operations for transmitting an application request to an application server, the application request based on an application parameter; receiving application data from the application server; transmitting a configuration data request to a configuration server, the configuration data request based on a configuration parameter; receiving configuration data from the configuration server; generating a data repository report request based on the received application data and configuration data; accessing a plurality of data servers to acquire project data related to the data repository report request; and, generating at least one consolidated data repository report based on the project data.

These and other objects, features and advantages of the present invention will become apparent from the following detailed description of illustrative embodiments thereof, which is to be read in connection with the accompanying drawings.

BRIEF DESCRIPTION OF THE DRAWINGS

These and other features of the present disclosure will become better understood with regard to the following description and accompanying drawings in which.

DETAILED DESCRIPTION

Aspects and implementations of the present disclosure will be understood more fully from the detailed description given below and from the accompanying drawings of the various aspects and implementations of the disclosure. This should not be taken to limit the disclosure to the specific aspects or implementations, and is offered for explanation and understanding only.

Figure 1:
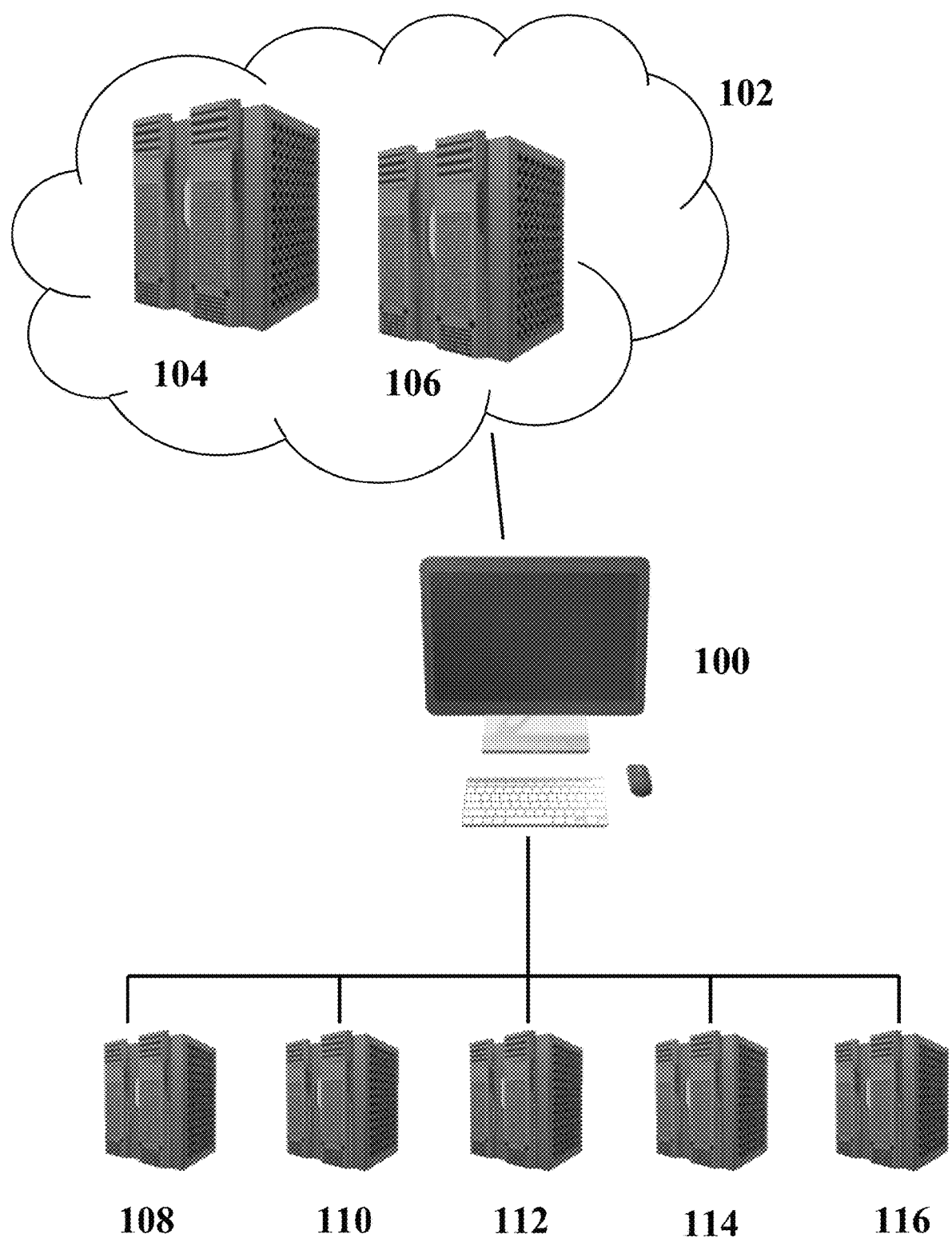
FIG. 1 shows an exemplary view of a data flow of an exemplary system for generating at least one consolidated data repository report.

FIG. 1 shows an exemplary view of a data flow of an exemplary system for generating at least one consolidated data repository report. User Device 100 is operable to communicate with Application Server 104 and Configuration Server 106 over a Network 102, such as the Internet or an Intranet network. User Device 100 may be a desktop or laptop computer or the like, characterized by at least a processor in communication with a memory. Some hardware configurations may include peripheral devices such as a graphics card, sound card, or similar hardware. User Device 100 may optionally include an attached or remote display, such as an LCD, LED, OLED display, or the like. In some configurations, User Device 100 may have a speaker or may be operably connected to an external speaker system. User Device 100 may further feature an attached or remote storage, such as an attached external hard disk drive or a remote network attached storage. In some embodiments, User Device 100 is a mobile device, such as a smart phone or tablet. User Device 100 may be configured to operably receive input from a peripheral device such as a mouse, keyboard, stylus, touch, or the like. In some embodiments, User Device 100 is operable to receive user input via a graphical user interface. Additional input devices or methods will be apparent to those of skill in the art. User Device 100 may have additional configurations of computer hardware and software recognizable to those of skill in the art, such that a processor is operable to communicate with a memory to transmit and receive data over a network.

Upon receiving an application initialization request from a user, User Device 100 may form a connection with Application Server 104 to transmit an application request over Network 102. In some embodiments, an initialization request and/or application request may be made automatically, for instance, according to a schedule. The connection between User Device 100 and Application Server 104 may be authenticated with a password, passcode, or the like. In some embodiments, User Device 100 is authenticated by executable code or by executing one or more applications designed to confirm the User Device 100 is authorized to access the Application Server 104. Authentication procedures may be initiated and performed by User Device 100, Application Server 104, or Network 102, either separately or in accordance with one another.

Application Server 104 may be configured to deploy executable application files to User Device 100 or similar remote computing devices in response to an application request transmitted by the User Device 100. The executable application files may further be generally referenced to as application data. User Device 100 may generate and send an application request to Application Server 104 in response to a user input or command, or in some embodiments, may generate and send an application request automatically, such as according to a schedule. An application request sent or transmitted by User Device 100 may be a download request, or similar set of instructions that cause the Application Server 104 to transmit an executable application file to User Device 100. It will be appreciated that the generation, initialization, transmission, and/or sending of an application request to Application Sever 104 may be accomplished through user input at User Device 100, through the execution of remote commands at User Device 100, or may occur automatically, such as according to a schedule. Application Server 104 may be any network enabled computer having a storage and operable to host application files. In some embodiments, Application Server 104 may be a collection of servers storing executable application files. Application Server 104 is further operable to receive and store data from outside sources, such as other computers on the network, or in some embodiments, computers outside of the network.

In some embodiments, User Device 100 is configured to generate an application request according to application parameters and transmit the request to Application Server 104. Application parameters may include the type of application, the intended use of the application, the file size of the application, the recommended computing resources required to execute the application, or other information describing the application files. Application parameters may be generated and/or selected according to user input at User Device 100. In some embodiments, application parameters are selectable via a user interface. In other embodiments, application parameters may be automatically generated based on data or information relating to a project. Depending on the project information and data available at User Device 100, various application parameters may be automatically selected or suggested to a user as appropriate according to the available project data.

In response to receiving a request from User Device 100, Application Server 104 is configured to run and/or return a Report Application to User Device 100 according to the application parameters. The Report Application may be any type of executable file operable to execute instructions at the User Device 100. The Report Application may be further configured and/or modified at User Device 100 according to additional application parameters and/or user settings and preferences. In some embodiments, Application Server 104 may be configured to transmit application files to User Device 100 automatically, such as based on a timer or according to a schedule, for example every 30 days.

User Device 100 may also be configured to form a connection with Configuration Server 106 over Network 102. In some embodiments, this connection is authenticated with a password, passcode, or the like. In other embodiments, User Device 100 is authenticated by executable code or by execution of one or more applications designed to confirm the User Device 100 is authorized to access the Configuration Server 106. Configuration Server 106 may be configured to deploy configuration data or files to User Device 100 or similar remote computing devices in response to a configuration data request transmitted by the User Device 100. User Device 100 may generate and send a configuration data request to Configuration Server 106 in response to a user input or command, or in some embodiments, may generate and send a request automatically, such as according to a schedule. A configuration data request sent or transmitted by User Device 100 may be a download request, or similar set of instructions that cause the Configuration Server 106 to transmit a configuration file or related configuration data to User Device 100. It will be appreciated that the generation, initialization, transmission, and/or sending of a configuration data request to Configuration Server 106 may be accomplished through user input at User Device 100, through the execution of remote commands at User Device 100, or may occur automatically, such as according to a schedule.

Configuration Server 106 may be any network enabled computer having a storage and operable to host configuration files. In some embodiments, Configuration Server 106 may be a collection of servers storing configuration files. Some Configuration files are operable to configure settings at Data Servers 108, 110, 112, 114, and 116. Various configuration files may be accessed at the Configuration Server 106 according to configuration data parameters. Configuration data parameters may include information about the data or type of server operable to be configured by the configuration file. User Device 100 is configured to transmit a configuration data request based on at least one configuration parameter. Configuration parameters may be defined and/or generated at User Device 100 according to user input via a user interface, however, in some embodiments, configuration parameters are automatically defined according to project related information and data. In some embodiments, Configuration files may be any type of executable file, that when executed by User Device 100, modify settings at a data server. Other Configuration files may be operable to change and/or modify settings at User Device 100, such as settings associated with the Report Application.

In some embodiments, the Application Server 104 and the Configuration Server 106 may reside on the same server or cluster of servers. It will be appreciated by those of skill in the art that the above characterizations of the Application Server 104 and the Configuration Server 106 are offered for illustration purposes only and that the Application Server 104 and the Configuration Server 106 may operate in substantially the same manner regardless of their physical configuration on one or more servers. Similarly, application parameters and configuration parameters may be combinable in a single format or file.

User Device 100 may be configured to modify parameters associated with the Report Application. User Device 100 may be further configured to modify the configuration settings on Configuration Server 106. For example, User Device may change or modify data server identification information or data normalization parameters. In some embodiments, User Device 100 may modify Report Application parameters by a user interface. User Device 100 may have a plurality of user interface components configured to accept user input and display output. Additional user interface functionality may be related to a visual indicator configured to inform a user of progress related to the Report Application. It is further appreciated that User Device 100 may be configured to alert a user of progress related to Report Application via an auditory alert, such as a sound played through a speaker of User Device 100.

User Device 100 may be configured to transmit a request to Data Servers 108, 110, 112, 114, and 116 by execution of the Report Application. In some embodiments, the request is a data repository report request. A data repository report request may be based on application parameters and configuration parameters as selected, defined, or otherwise provided by User Device 100. Data Servers 108, 110, 112, 114, and 116 comprise at least one data repository and may be configured to host information pertaining to various projects within an organization. Other Data Servers not shown may also be operable to communicate with User Device 100. In some embodiments, User Device 100 may be configured to connect to data servers outside of an organization over Network 102. Severs outside of the organization may be authenticated by User Device 100 or Network 102. It will be appreciated that the number of data servers may vary according to the size of the organization or project. In other embodiments, Data Servers 108, 110, 112, 114, and 116 may be operable to collect information from parties outside of the organization. In some embodiments, the information hosted by or at a Data Server may be bug and issue tracking information, for example, information may be gathered through a bug and issue tracking application such as Jira. As various teams and projects throughout an organization record information into a bug and issue tracking application, data may be generated by the bug and issue tracking application and stored at a data repository hosted on one of Data Servers 108, 110, 112, 114, and 116. In some embodiments, the bug and issue tracking application may store data remotely, and the data may only be accessed through a connection made from one of Data Servers 108, 110, 112, 114, and 116.

In some embodiments, Data Servers 108, 110, 112, 114, and 116 communicate with User Device 100 over an Internet or Intranet connection. While Data Servers 108, 110, 112, 114, and 116 may be connected on a common network, in many cases the nature of the data renders communication between the various servers impossible. Some data servers may store the same data in different formats, which may prevent the servers from communicating. Other data servers may have their ability to communicate with other servers removed or restricted according to policy set by the system administrator. In some situations, the nature of the data stored on the data servers may be restricted based on privacy regulations or other applicable laws. User Device 100 may maintain a plurality of simultaneous connections with various Data Servers. In some embodiments, the connection between User Device 100 and a Data Server is authenticated with a password, passcode, or the like. In other embodiments, User Device 100 is authenticated by executable code or one or more applications designed to confirm the User Device 100 is authorized to access one or more of the Data Servers 108, 110, 112, 114, and 116. In some embodiments, the required authentication will vary depending on settings associated with a particular Data Server.

In response to a request received from the User Device 100 via the Report Application, a Data Server may query other systems to update the information stored at the Data Server. For example, in some embodiments, Data Servers 108, 110, 112, 114, and 116 may have associated data repositories which collect data from other servers or other data repositories. As each Data Server may include several data repositories, the Data Server may perform periodic queries to the data repositories to determine if data has been modified, and in some embodiments, automatically update the information stored at the Data Server. A visual indicator may be displayed on the User Device 100 to indicate if a particular Data Server has been updated recently. In some embodiments, visual indicators may display a date and/or time of the last update, or may indicate a general period of time since the last update. For example, the visual indicator may be colored green to indicate that the data on the server has been updated within a preferred period of time, such as the last 24 hours. Similarly, the visual indicator may be colored red or yellow to indicate that the server was last updated outside of the preferred period of time. In some embodiments, the visual indicators may change automatically, based on the amount of time that has elapsed since the last update. It is appreciated that the preferred period of time or the assigned visual indicators may vary according to user preference or settings as determined by the User Device 100 or any one of the Data Servers 108, 110, 112, 114, and 116.

User Device 100 may receive the responses from a plurality of the Data Servers 108, 110, 112, 114, and 116 and store the response data locally on the User Device 100, or in some embodiments, at an attached storage, such as an external hard drive or USB thumb-drive. Once the response data has been received, the User Device 100 may consolidate the response data and generate a consolidated report via the Report Application. In some embodiments, User Device 100 is configured to remove unwanted or unnecessary work items from the consolidated report. For example, the response data may include project updates or information that is only relevant in the context of a single workgroup of the organization. The consolidated report may be displayed at User Device 100 by hiding or minimizing irrelevant or unwanted data. Such consolidation frees up valuable screen space and enhances user interface components of User Device 100. Prior systems were limited in that a user could not obtain a consolidated and holistic view of the work for an entire organization. These limitations are overcome by the technical solutions described herein. Data relevance may be determined at least by the application parameters input at User Device 100. In some embodiments, criteria for assessing data relevance may be based on the Report Application and associated parameters. Data relevance may further be assessed or determined according to configuration parameters. In other embodiments, data relevance may be determined automatically based on one or more factors, such as, but not limited to, the author or team of the project or data, the date of production, the workgroup, etc. As irrelevant data is removed from a report, a visual indicator may be generated to indicate to a user that the report has removed data.

In some embodiments, User Device 100 is configured to generate one or more data visualizations of the consolidated report. A data visualization may be a chart, graph, table, or the like. In some embodiments, the data visualization is generated in accordance with at least one dependency indicator. A dependency indicator may alert a user of conflicts within the data. For example, when data between two or more groups within an organization has been determined to be in conflict in the order of operation, an indicator is applied to highlight the data that causes the conflict. In some embodiments the indicator is a visual indicator such as a highlight or underline. Dependency indicators may also be configured to organize dependency information into a list. A dependency indicator list may be collapsed or expanded based on user input or interaction. In some embodiments, the dependency indicator list may summarize the subject matter relevant to the identified dependency and allow a user to expand the list to display additional details or collapse the list to hide the additional details. It will be appreciated that other forms of visualization may be applied to draw attention to the conflict in the data. Data visualizations of the response data may provide a user with a holistic view of organizational work progress; past, present, and future. The visualizations may further allow users to answer various questions about the holistic approach to achieving an organization's work goals, while improving user interface aspects related to project management.

Figure 2:
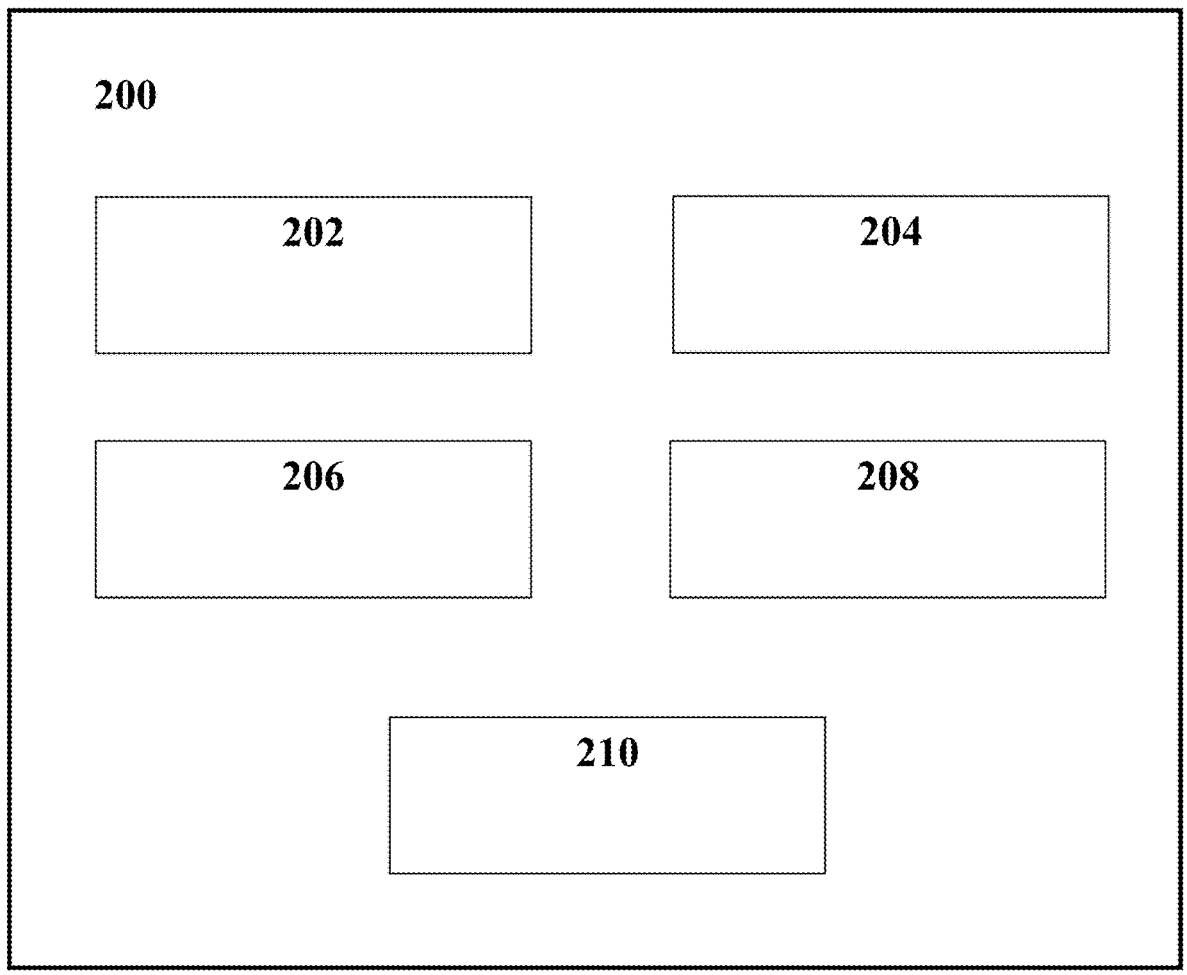
FIG. 2 shows an exemplary view of a system for generating at least one consolidated data repository report.

FIG. 2 shows an exemplary view of a system 200 for generating at least one consolidated data repository report. In some embodiments, Application Request Module 202 may be configured to generate an application request based on a plurality of application parameters. Application Request Module 202 may be further configured to transmit the request to an application server, such as Application Server 104. In some embodiments, Application Request Module 202 may enable a user of system 200 to select a particular application from a list or table, or may allow the user to select parameters that define a particular application.

Configuration Data Request Module 204 may be configured to generate a configuration data request and transmit the request to a configuration server, such as Configuration Server 106. Configuration Server 106 may modify or create configuration parameters relating to, for example, data server information, organization information, organizational structure, organizational departmental responsibilities, etc.

Report Parameter Customization Module 206 may be configured to allow a user of system 200 to customize desired report parameters, such as informational relevance, dependency information, or the type of visualization to be generated with the report.

Data Repository Request Module 208 may be configured to generate a data request and transmit the request to a plurality of data servers, such as Data Servers 108, 110, 112, 114, and 116. Issue and bug tracking applications such as Jira provide API interfaces operable to transmit and store data at Data Severs 108, 110, 112, 114, and 116. It will be appreciated that other issue and bug tracking applications may achieve the same functionality.

Consolidated Data Repository Report Module 210 may be configured to generate a consolidated data repository report based at least on data received in response to Data Repository Request Module 208. In some embodiments, Consolidated Data Repository Report Module 210 may be configured to generate one or more data visualizations according to the consolidated data repository report. As described herein, a data visualization may be a chart, graph, table, or the like. In some embodiments, the data visualization is generated in accordance with at least one dependency indicator. A dependency indicator may alert a user of conflicts within the data. For example, when data between two or more groups within an organization has been determined to be in conflict in the order of operation, an indicator is applied to highlight the data that causes the conflict. In some embodiment the indicator is a visual indicator such as a highlight or underline. Dependency indicators may also be configured to organize dependency information into a list. A dependency indicator list may be collapsed or expanded based on user input or interaction. In some embodiments, the dependency indicator list may summarize the subject matter relevant to the identified dependency and allow a user to expand the list to display additional details or collapse the list to hide the additional details. It will be appreciated that other forms of visualization may be applied to draw attention to the conflict in the data. Data visualizations of the response data may provide a user with a holistic view of organizational work progress; past, present, and future. The visualizations may further allow users to answer various questions about the holistic approach to achieving an organization's work goals, while improving user interface aspects related to project management.

Figure 3:
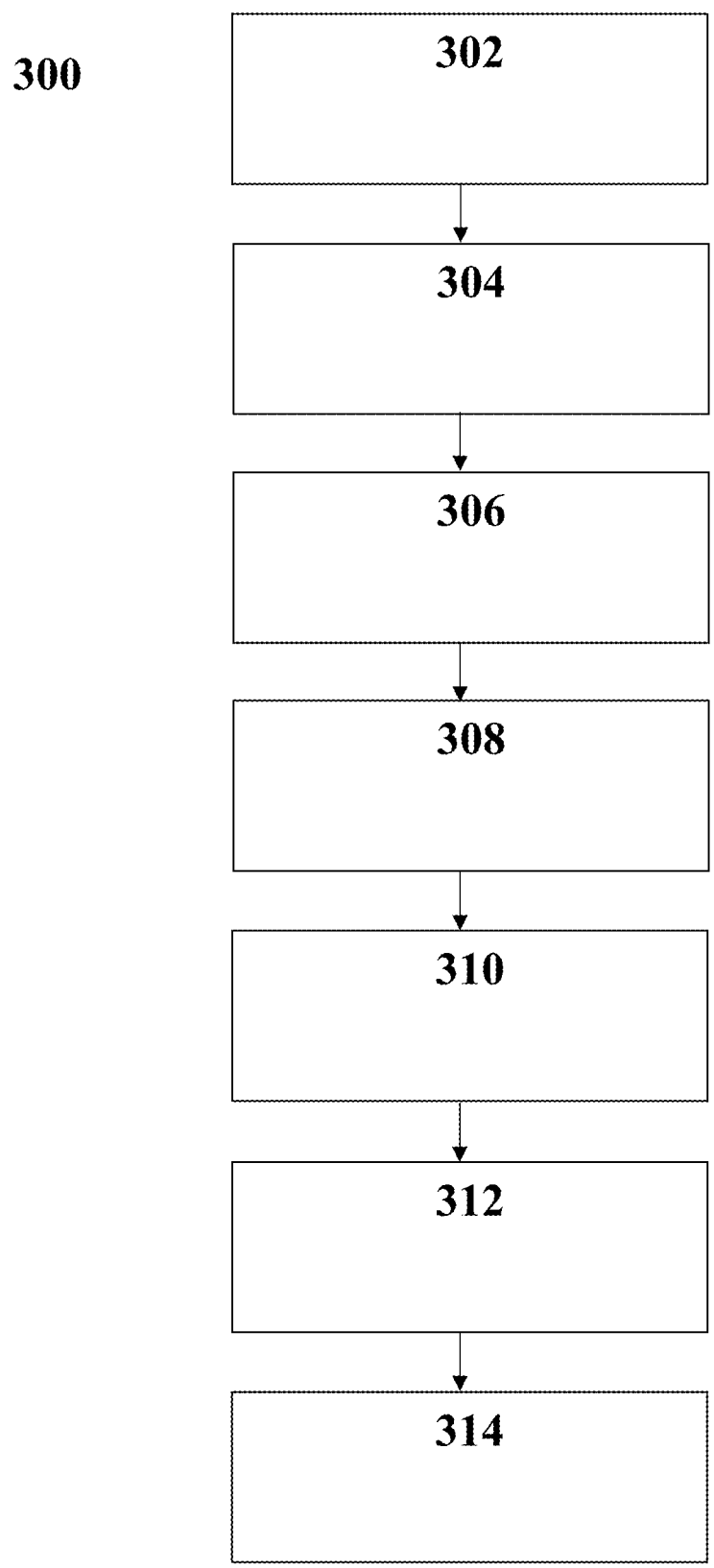
FIG. 3 shows an exemplary view of steps performed by an exemplary method for generating at least one consolidated data repository report.

FIG. 3 is exemplary view of steps performable by an exemplary method 300 for generating at least one consolidated data repository report. At step 302, an application request is transmitted to an application server, such as Application Server 104. The application request may be based on at least one application parameter. At step 304, application data is received from the application server. Application data may comprise an executable file, such as, for example, a Report Application. At step 306, a configuration data request is transmitted to a configuration server, such as Configuration Server 106. The configuration data request may be based on at least one configuration parameter. At step 308, configuration data is received from the configuration server. At step 310, a data repository report request may be generated according to or based on at the received application data and configuration data. In some embodiments, application and configuration data may be received as a single parameter or settings file. At step 312 a connection is made to a plurality of data servers to acquire project data related to the data repository request. At step 314 at least one consolidated data repository report is generated based on the project data. It will be appreciated that these and additional steps of exemplary method 300 may be performed without limitation according to the various implementations and configurations as described herein.

The term "module" or "engine" used herein will be appreciated as comprising various configurations of computer hardware and/or software implemented to perform operations. In some embodiments, modules or engines as described may be represented as instructions operable to be executed by a processor and a memory. In other embodiments, modules or engines as described may be represented as instructions read or executed from a computer readable media. A module or engine may be generated according to application specific parameters or user settings. It will be appreciated by those of skill in the art that such configurations of hardware and software may vary, but remain operable in substantially similar ways.

It is to be understood that the detailed description is intended to be illustrative, and not limiting to the embodiments described. Other embodiments will be apparent to those of skill in the art upon reading and understanding the above description. Moreover, in some instances, elements described with one embodiment may be readily adapted for use with other embodiments. Therefore, the methods and systems described herein are not limited to the specific details, the representative embodiments, or the illustrative examples shown and described. Accordingly, departures may be made from such details without departing from the spirit or scope of the general aspects of the present disclosure.

What is claimed is:

1. A computer implemented method for generating at least one consolidated data repository report comprising:
   transmitting an application request to an application server, the application request based on an application parameter;
   receive application data from the application server;
   transmitting a configuration data request to a configuration server, the configuration data request based on a configuration parameter;
   receive configuration data from the configuration server;
   generating a data repository report request based on the received application data and configuration data;
   connecting to a plurality of data servers to acquire project data related to the data repository report request;
   generating the at least one consolidated data repository report based on the project data; and
   generating at least one data illustration based on the consolidated data repository report;
   wherein the at least one data illustration is generated according to at least one dependency indicator, the dependency indicator including an alert of one or more conflicts present within the data.

2. The method of claim 1, wherein the at least one dependency indicator is configured to organize dependency information into a collapsible list.

3. The method of claim 1, further comprising displaying the at least one consolidated data repository report on at least a first display.

4. The method of claim 1, further comprising authenticating a connection between the application request module and the application server.

5. The method of claim 1, further comprising authenticating a connection between the configuration data request module and the configuration server.

6. The method of claim 1, further comprising displaying at least one visual indicator to indicate how recently a data repository has been updated.

7. A system for generating at least one consolidated data repository report, wherein the system comprises at least one processor in communication with a memory, the at least one processor configured to:
   transmit an application request to an application server, the application request based on an application parameter;
   receive application data from the application server;
   transmit a configuration data request to a configuration server, the configuration data request based on a configuration data parameter;
   receive configuration data from the configuration server;
   generate a data repository report request based on the received application data and configuration data;
   access a plurality of data servers to acquire project data related to the data repository report request;
   generate at least one consolidated data repository report based on the project data; and
   generate at least one data illustration based on the consolidated data repository report;
   wherein the at least one data illustration is generated according to at least one dependency indicator, the dependency indicator including an alert of one or more conflicts present within the data.

8. The system of claim 7, wherein the at least one dependency indicator is configured to organize dependency information into a collapsible list.

9. The system of claim 7, wherein the processor is further configured to:
   display the at least one consolidated data repository report on at least a first display.

10. The system of claim 7, wherein the processor is further configured to:
    authenticate a connection between the application request module and the application server.

11. The system of claim 7, wherein the processor is further configured to:
    authenticate a connection between the configuration data request module and the configuration server.

12. The system of claim 7, wherein the processor is further configured to:
    display at least one visual indicator to indicate how recently a data repository has been updated.

13. The system of claim 7, wherein the processor is further configured to:
    consolidate the acquired project data by at least removing irrelevant data.

14. The system of claim 13, wherein the irrelevant data is removed based at least on data relevance determined according to the application parameter.

15. A non-transitory computer readable medium having instructions stored thereon for executing a method of generating at least one consolidated data repository, wherein when the instructions are executed by a processor, the processor is caused to perform operations for:
    transmitting an application request to an application server, the application request based on an application parameter;
    receiving application data from the application server;
    transmitting a configuration data request to a configuration server, the configuration data request based on a configuration parameter;
    receiving configuration data from the configuration server;
    generating a data repository report request based the received application data and configuration data;
    accessing a plurality of data servers to acquire project data related to the data repository report request;
    generating at least one consolidated data repository report based on the project data;
    generating at least one data illustration based on the consolidated data repository report;
    wherein the at least one data illustration is generated according to at least one dependency indicator, the dependency indicator including an alert of one or more conflicts present within the data.

16. The method of claim 1, wherein the alert comprises a visual highlight of the data that causes the one or more conflicts.

17. The method of claim 1, wherein the generating the at least one data illustration comprises generating an indication that irrelevant data has been removed.

* * * * *